(12) United States Patent
Nahari (10) Patent No.: US 10,032,164 B2
(45) Date of Patent: Jul. 24, 2018

(54) SYSTEMS AND METHODS FOR AUTHENTICATING PAYMENTS OVER A NETWORK

(75) Inventor: Hadi Nahari, Mountain View, CA (US)

(73) Assignee: PAYPAL, INC., San Jose, CA (US)

( * ) Notice: Subject to any disclaimer, the term of this patent is extended or adjusted under 35 U.S.C. 154(b) by 1048 days.

(21) Appl. No.: 12/970,719

(22) Filed: Dec. 16, 2010

(65) Prior Publication Data

US 2012/0158542 A1 Jun. 21, 2012

(51) Int. Cl.
  *G06Q 20/00* (2012.01)
  *G06Q 20/40* (2012.01)
  *G06Q 30/02* (2012.01)
  *G06Q 30/06* (2012.01)
  *H04L 29/06* (2006.01)

(52) U.S. Cl.
  CPC ........... *G06Q 20/40* (2013.01); *G06Q 30/02* (2013.01); *G06Q 30/0209* (2013.01); *G06Q 30/0601* (2013.01); *G06Q 30/0613* (2013.01); *G06Q 30/0641* (2013.01); *H04L 63/126* (2013.01); *H04L 63/18* (2013.01); *H04L 63/0884* (2013.01)

(58) Field of Classification Search
  None
  See application file for complete search history.

(56) References Cited

U.S. PATENT DOCUMENTS

| | | | | |
|---|---|---|---|---|
| 7,941,534 B2* | 5/2011 | de la Huerga | ................ | 709/225 |
| 8,166,404 B2* | 4/2012 | Grinstein | ...................... | 715/735 |
| 8,639,629 B1* | 1/2014 | Hoffman | ................ | G06Q 20/20 |
| | | | | 705/44 |
| 2003/0046237 A1* | 3/2003 | Uberti | ............................. | 705/44 |
| 2003/0105725 A1* | 6/2003 | Hoffman | ......................... | 705/75 |
| 2003/0126094 A1* | 7/2003 | Fisher et al. | .................... | 705/75 |
| 2004/0122955 A1* | 6/2004 | Park | .............................. | 709/227 |
| 2004/0243520 A1* | 12/2004 | Bishop et al. | .................. | 705/75 |
| 2005/0021645 A1* | 1/2005 | Kulkarni et al. | ............. | 709/206 |
| 2005/0091338 A1* | 4/2005 | de la Huerga | ................ | 709/217 |
| 2007/0079384 A1* | 4/2007 | Grinstein | ........................ | 726/27 |
| 2007/0157320 A1* | 7/2007 | Collins et al. | .................. | 726/27 |
| 2007/0288394 A1* | 12/2007 | Carrott | .................... | G06F 21/10 |
| | | | | 705/78 |
| 2008/0162508 A1* | 7/2008 | Sinai | ............................. | 707/100 |
| 2010/0250398 A1* | 9/2010 | Susilo | .................... | G06Q 30/02 |
| | | | | 705/26.1 |

* cited by examiner

*Primary Examiner* — John Hayes
*Assistant Examiner* — Tim Hale
(74) *Attorney, Agent, or Firm* — Haynes and Boone, LLP (57) ABSTRACT

A system and method for facilitating electronic commerce over a network, according to one or more embodiments, includes communicating with a user via a user device over the network, distributing a resident application to the user device over the network, displaying a service icon on the user device, and receiving an authentication request from the user via the user device over the network. The service icon is linked to the resident application, and the authentication request includes user credentials inputted by the user via user selection of the service icon and resulting user access of the resident application. The system and method includes communicating with the resident application on the user device to request user confirmation of the authentication request, receiving user confirmation from the user via the user device over the network, authorizing the authentication request, and notifying the user of the authorized authentication request over the network via the resident application.

20 Claims, 5 Drawing Sheets

SYSTEMS AND METHODS FOR AUTHENTICATING PAYMENTS OVER A NETWORK

BACKGROUND

Technical Field

The present invention generally relates to facilitating electronic commerce over a network and, more particularly, to authenticating payments over a network.

Related Art

In online financial transactions, users typically search for and purchase products and services through electronic communications with online merchants over electronic networks, such as the Internet. During the course of these transactions, users may provide payment in various ways including, for example, credit cards, electronic fund transfers, and other payment techniques offered by payment providers.

Typically, when online shopping at a particular website, customers select items to purchase by clicking on a link for a specific item. The selected items are placed on reserve in some type of virtual shopping cart. When done shopping, the customer proceeds to a checkout page to provide some form of payment for the selected items. At this point in the process, the customer provides some form of identification material to authenticate the customer and authorize payment. When the customer continues shopping and is ready to purchase items from another website, the customer is typically prompted again to re-enter some form of identification material, authenticate herself and subsequently authorize payment.

This process can be tedious and inconvenient. Entering information every time an online transaction takes place is inefficient and time consuming. Thus, there currently exists a need to improve the process of purchasing products and services in online transactions.

SUMMARY

Embodiments of the present disclosure provide systems and methods for facilitating electronic commerce over a network including authenticating payments by utilizing a trusted entity (e.g., resident software on a user device, such as a personal computer or application on a mobile communication device) to authenticate the user requesting a purchase through a resident user interface application. In one implementation, a service provider may distribute the resident software application to the user device, which may be displayed as an icon on a desktop environment of the user device. When the user requests a purchase, the user may input user credentials through the user interface application of the user device, such as user name, password, and payment amount. User information related to user credentials may be transmitted to the service provider, and then the service provider is adapted to communicate with the resident software on the user device, which causes a pop-up notification window from the system tray to display and wait for user confirmation. The user may confirm purchase through the pop-up notification window, which may then be conveyed to the service provider. After receiving user confirmation, the service provider may authenticate the purchase and notify the user and a related merchant of purchase authentication.

In one implementation, communication between the user, merchant, and service provider is conducted over a network, such as the Internet and/or a mobile communication network. In another implementation, the trusted entity (e.g., resident software application) is utilized by the service provider to authenticate the user purchase request. The trusted entity may be utilized as a resident software application on a personal computer and/or a mobile communication device.

A system and method, according to one embodiment, includes communicating with a user via a user device over the network, distributing a resident application to the user device over the network, displaying a service icon on the user device, and receiving an authentication request from the user via the user device over the network. The service icon is linked to the resident application, and the authentication request includes user credentials inputted by the user via user selection of the service icon and resulting user access of the resident application. The systems and methods include communicating with the resident application on the user device to request user confirmation of the authentication request, receiving user confirmation from the user via the user device over the network, authorizing the authentication request, and notifying the user of the authorized authentication request over the network via the resident application.

In various implementations, the systems and methods may include communicating with a merchant via a merchant device over the network. The merchant device is adapted to allow the merchant to provide one or more items for purchase over the network. The authentication request may include a purchase request between the user and the merchant. The purchase request may request authorization of the user to purchase at least one item from the merchant based on information passed with the purchase request. Authorizing the authentication request may include authorizing the purchase request between the user and the merchant. Notifying the user may include notifying the user and the merchant of the authorized purchase request over the network. The systems and methods may include storing information in an account related to the user. The user account includes information related to the user including information related to the user credentials, authentication requests, and authorized authentication requests.

In various implementations, the user device may include a browser application adapted to allow a user to access the merchant device via the network and view the one or more items for purchase. The resident application may include a payment mechanism that allows the user to generate the purchase request for the at least one item by selecting the at least one item from the merchant device. The service icon may be displayed in a system tray of the user device, and selection of the service icon may allow the user to input credentials into the browser application of the user device, and user credentials includes one or more of user name, password, and payment amount.

In various implementations, the resident application comprises a trusted entity for verifying the identity of the user and authorizing authentication requests on behalf of the user. Communicating with the resident application on the user device may occur after receiving the user credentials from the user via the user device over the network. Requesting user confirmation of the authentication request may include displaying a pop-up notification window to the user via the user device from the service icon displayed by the user device, and the resident application may be adapted to cause display of the pop-up notification window from the service icon. The user may confirm the authentication request from the pop-up notification window, and the user confirmation is sent over the network. The resident application may be adapted to communicate with the user via a browser application, and the user may be notified of the authorized authentication request over the network via the resident application communicating with the browser application. The user device may comprise a mobile communication device, such as a mobile phone. The purchase request may include a payment request.

These and other aspects of the present disclosure will be more readily apparent from the detailed description of the embodiments set forth below taken in conjunction with the accompanying drawings.

Embodiments of the invention and their advantages are best understood by referring to the detailed description that follows.

DETAILED DESCRIPTION

Embodiments of the present disclosure provide systems and methods for facilitating electronic commerce over a network including authenticating payments via segmented band authentication, which is adapted to utilize a trusted entity (e.g., resident software on a user device, such as a personal computer or application on a mobile communication device) to authenticate the user requesting a purchase and/or payment through a resident user interface application, such as a network browser on the user device. In one implementation, a service provider may distribute the resident software application to the user device, which may be displayed as an icon on a system tray of the user device. When the user requests a purchase and/or payment, the user may enter user credentials through the user interface application of the user device, such as user name, password, and payment amount. Information related to user credentials may be transmitted to the service provider, and then the service provider is adapted to communicate with the resident software on the user device, which causes a pop-up notification window from the system tray to display and wait for user confirmation. The user may confirm purchase and/or payment through the pop-up notification window, which may then be conveyed to the service provider. After receiving user confirmation, the service provider may authenticate the purchase and/or payment and notify the user and a related merchant of purchase and/or payment authentication.

In one aspect, communication between the user, the merchant, and the service provider is conducted over a network, such as the Internet and/or a mobile communication network. In another aspect, the trusted entity (e.g., resident software application) is utilized by the service provider to authenticate the user purchase and/or payment request. In another aspect, the trusted entity may be utilized as a resident software application on a personal computer and/or a mobile communication device. These and other aspects of the present disclosure are described in greater detail herein.

Figure 1:
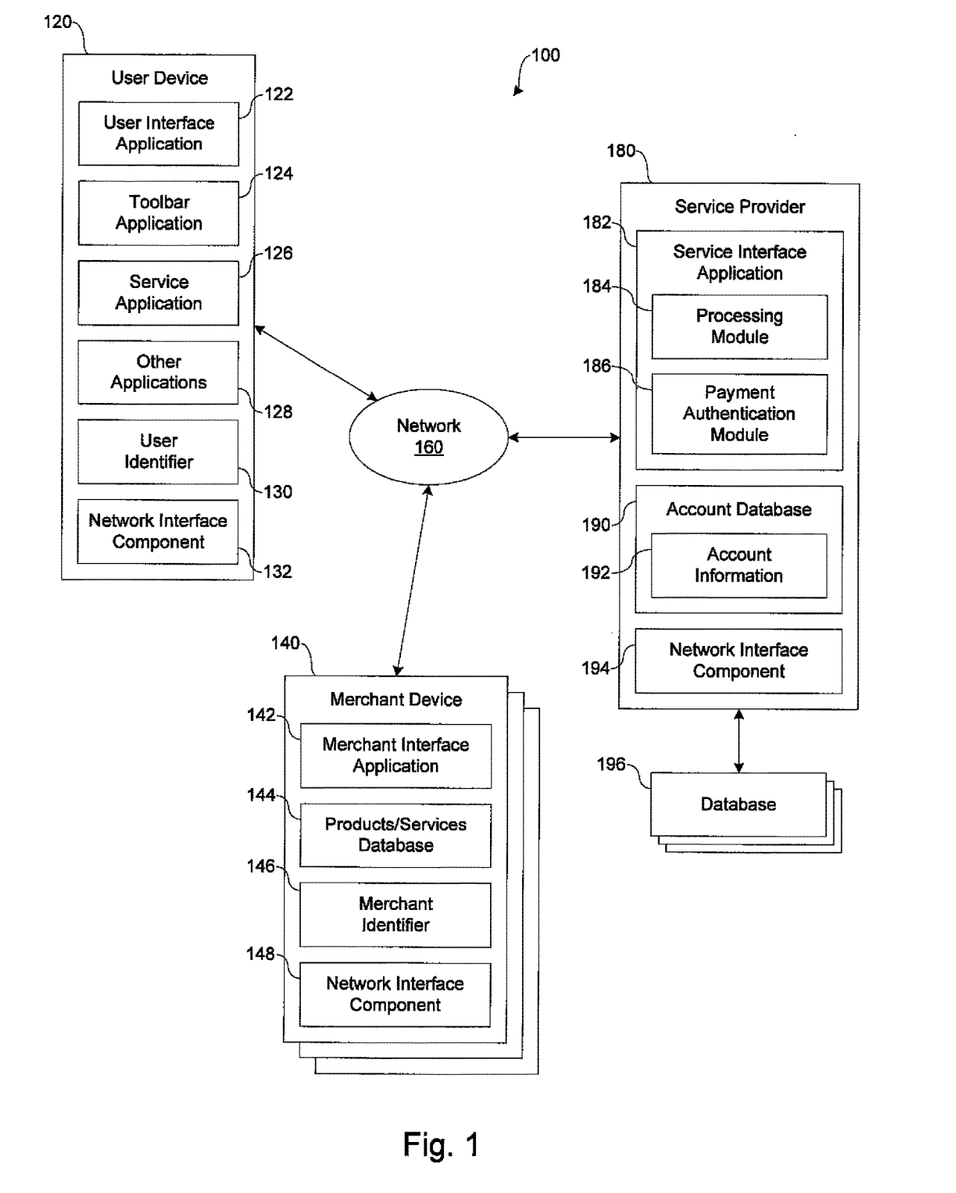
FIG. 1 shows a block diagram of a system adapted to facilitate electronic commerce over a network, in accordance with embodiments of the present disclosure.

FIG. 1 shows one embodiment of a block diagram of a system 100 configured to facilitate financial transactions over a network 160. As shown in FIG. 1, system 100 includes at least one user device 120, one or more merchant servers 140, and at least one service provider server 180 in communication over the network 160.

The network 160, in one embodiment, may be implemented as a single network or a combination of multiple networks. For example, the network 160 may include a wireless telecommunications network (e.g., cellular telephone network) adapted for communication with one or more other communication networks, such as the Internet. In other examples, the network 160 may include the Internet, one or more intranets, landline networks, wireless networks, and/or one or more other appropriate types of communication networks. As such, in various implementations, the user device 120, the one or more merchant devices 140, and the service provider 180 may be associated with a particular link (e.g., a link, such as a URL (Uniform Resource Locator) to an IP (Internet Protocol) address).

The user device 120, in various embodiments, may be implemented using any appropriate combination of hardware and/or software configured for wired and/or wireless communication over the network 160. In one embodiment, the user device 120 may be implemented as a mobile communication device (e.g., wireless cellular phone) adapted for communication with the network 160. In other embodiments, the user device 120 may be implemented as a personal computer (PC), a personal digital assistant (PDA), a notebook computer, and/or various other generally known types of wired and/or wireless computing devices for communication with the network 160. It should be appreciated that the user device 120 may be referred to as a client device or a customer device without departing from the scope of the present disclosure.

In one embodiment, the user device 120 may include a user interface application 122 which may be utilized, for example, as a browser application to allow the user to browse information available over the network 160. As such, the user interface application 122 may be implemented as a web browser to view information available over the Internet.

In one embodiment, the user device 120 may include one or more toolbar applications 124, which may be used, for example, to provide client-side processing for performing tasks in response to operations selected by the user. For example, the toolbar application 124 may display a graphical user interface (GUI) in connection with the user interface application 122.

In one embodiment, the user device 120 may include a service application 126 for facilitating financial transactions on the network 160. In one implementation, the service application 126 comprises a software program, such as a graphical user interface (GUI), executable by a processor that is configured to interface and communicate with the one or more merchant servers 140 and the service provider server 180 via the network 160. The user is able to access merchant websites via merchant servers 140 to view and select items for purchase, and the user is able to purchase selected items from merchants 140 by communicating with the service provider server 180.

When installed and executed by the user device 120, the service application 126 is configured to provide and display a purchase mechanism and/or payment mechanism, such as an image or icon, on a display component (e.g., monitor) of the user device 120 including a system tray displayed by the user device 120. In one aspect, an icon is a pictorial image used in a graphical user interface (GUI) to represent a program, application, command, link to a web page, etc., wherein the user may select an object or action by clicking on a related icon with a cursor control component (e.g., mouse). In one implementation, upon installation of the service application 126, the user may be prompted to establish a user account with the service provider server 180, wherein the user may use the user device 120 to access the service provider server 180 via the network 160. When establishing a user account, the user may be asked to provide personal information, such as name, address, phone number, etc., and financial information, such as banking information, payment media information (e.g., debit and/or credit card information), etc.

In one embodiment, the user interface application 122 in conjunction with the service application 126 may be utilized by a user to conduct network based financial transactions (e.g., remote network based electronic commerce) with the one or more merchant devices 140 and/or the service provider 180 over the network 160. The user interface application 122 in conjunction with the service application 126 may be implemented as a network commerce application and/or a mobile commerce application to initiate, track, manage, and store data and information (e.g., user identity data and information) related to network based electronic commerce for viewing, searching, and/or purchasing items, products, and/or services over the network 160. In one aspect, the user device 120 may be linked to an account with the service provider 160 for direct and/or automatic settlement of purchase requests between a user and the one or more merchant devices 140 via the user interface application 122.

In one embodiment, the user interface application 122 in conjunction with the service application 126 are adapted to utilize a GUI software program executable by a processor that is configured to interface and communicate with the merchant devices 140 and/or the service provider 180 via the network 160. In one implementation, the user interface application 122 comprises a browser module adapted to provide a network interface to browse information (e.g., user identity information) available over the network 160. As such, the user interface application 122 may be implemented, in part, as a web browser to view and search various types of information available over the network 160. For example, the user is able to access merchant websites of the one or more merchant devices 140 over the network 160 to view, search, and select items, products, and/or services for purchase, and the user is able to purchase selected items, products, and/or services from the one or more merchant devices 140 via the service provider 180. The user may conduct network based financial transactions with one or more merchant devices 140 via the service provider 180.

In one embodiment, upon user instruction, the user interface application 122 and the service application 126 may be installed and/or run on the user device 120. The user may run the user interface application 122 and the service application 126 on the user device 120 to access the service provider 180 via the network 160. In one aspect, upon installation and/or execution of the user interface application 122 and the service application 126, the user may be prompted to establish a user account for login with the service provider 180. In another aspect, when establishing a user account, the user may provide personal information, such as name, location information (e.g., address), phone number, etc., and financial information, such as banking information, payment media information (e.g., debit and/or credit card information), etc. In another aspect, referring to FIG. 1, information related to the user may be packaged as a user identifier 126, which is described in greater detail herein.

The user device 120, in various embodiments, may include other applications 124 as may be desired in one or more embodiments of the present disclosure to provide additional features available to the user. In various examples, such other applications 124 may include security applications for implementing user-side security features, programmatic client applications for interfacing with appropriate application programming interfaces (APIs) over the network 160, and/or various other types of generally known programs and/or software applications. In various other examples, other applications 124 may interface with the user interface application 122 for improved efficiency and convenience. In one example, files, data, and/or information may be imported from various types of accounting software (e.g., a spreadsheet application) directly into the user interface application 122 for improved tracking of payments and settlements related to purchases via the network 160. Accordingly, it should be appreciated that the user interface application 122 and each of the other applications 124 are adapted to make API calls over the network 160.

The user device 120, in one embodiment, may include one or more user identifiers 130, which may be implemented, for example, as operating system registry entries, cookies associated with the user interface application 122, identifiers associated with hardware of the user device 120, or various other appropriate identifiers. The user identifier 130 may include attributes related to the user, such as personal information (e.g., a user name, password, photograph image, biometric id, address, phone number, etc.) and banking information (e.g., banking institution, credit card issuer, user account numbers, security information, etc.). In various implementations, the user identifier 130 may be passed with a user purchase request to the service provider server 180, and the user identifier 130 may be used by the service provider server 180 to associate the user with a particular user account maintained by the service provider server 180, in a manner as described herein.

The user device 120, in one embodiment, may include a network interface component (NIC) 132 adapted for communication with the network 160. In various implementations, the network interface component 132 may comprise a wireless communication component, such as a mobile cellular component, a wireless broadband component, various proximity-based network components such as near field communication (NFC) component, a wireless satellite component, or various other types of wireless communication components including radio frequency (RF), microwave frequency (MWF), and/or infrared frequency (IRF) components adapted for communication with the network 160. In various other implementations, the network interface component 132 may be adapted to interface with a DSL (e.g., Digital Subscriber Line) modem, a PSTN (Public Switched Telephone Network) modem, an Ethernet device, and/or various other types of wired and/or wireless network communication devices adapted for communication with the network 160.

The one or more merchant devices 140, in one embodiment, may be implemented using any appropriate combination of hardware and/or software configured for wired and/or wireless communication over the network 160. In various implementations, the merchant devices 140 may be implemented as a network server, a personal computer (PC), a personal digital assistant (PDA), a notebook computer, and/ or various other generally known types of wired and/or wireless computing devices for communication with the network 160. In another implementation, the merchant device 140 may be implemented as a mobile device (e.g., a wireless cellular phone) adapted for communication with the network 160.

In another embodiment, the one or more merchant devices 140 may be maintained as one or more network servers by one or more business entities (e.g., merchant sites, resource information sites, utility sites, real estate management sites, social networking sites, etc.) offering various items, products, and/or services for purchase and payment, which may need registration of user identity information as part of offering the items, products, and/or services to one or more users over the network 160. Accordingly, each of the one or more merchant devices 140 may comprise at least one network based server in communication with the network 160 having a merchant interface application 142 and a products/services database 144 for presenting and identifying one or more available items, products, and/or services for purchase via the network 160, which may be made available to the user device 120 for viewing and purchase by the user. In one aspect, each of the network based merchant servers may be accessible via a mobile communication device (e.g., wireless cellular phone) for management purposes. For example, each merchant entity may remotely access and interact with their own network based merchant server via a mobile communication device for management purposes.

In one embodiment, each of the merchant devices 140 includes the merchant interface application 142, which may be utilized by the one or more merchant devices 140 to conduct network based financial transactions (e.g., remote network commerce, such as shopping, purchasing, bidding, etc.) with one or more users via one or more user devices 120 and/or the service provider 180 over the network 160. For example, the merchant interface application 142 may be implemented as an electronic commerce application to initiate, track, manage, and store data and information (e.g., user identity data and information) related to remote network based commerce for the viewing, searching, and purchasing of items, products, and/or services over the network 160. In one aspect, each merchant device 140 may be linked to an account with the service provider 160 for direct and/or automatic settlement of purchase requests between each merchant 140 and one or more users via the merchant interface application 142.

In one implementation, the merchant interface application 142 comprises a software program, such as a GUI, executable by a processor configured to interface and communicate with one or more users via one or more user devices 120 and/or the service provider 180 via the network 160. In another implementation, merchant interface application 142 comprises a network interface module that makes information available to the user device 120 over the network 160. For example, the merchant interface application 142 may be implemented, in part, as a website manager to provide, list, and present information to the user device 120 via the network 160. In another example, each merchant 140 is capable of providing one or more network based merchant websites to allow viewing, searching, and selecting of items, products, and/or services for purchase by the user via the user device 120, and the user is able to purchase items, products, and/or services from the one or more merchant devices 140 via the merchant websites and the service provider 180. As such, each of the merchant devices 140 may conduct financial transactions with the user via the merchant interface application 142 and the service provider 180.

In various implementations, the merchant interface application 142 may include a marketplace application, which may be configured to provide transaction information related to the products and/or services database 144 to the user interface application 122 of the user device 120 via the network 160. In one aspect, the transaction information may include user identity information. For example, the user may interact with the merchant 140 via the marketplace application through the user interface application 122 over the network 160 to search and view various items, products, and/or services available for purchase from the products/services database 144. In one implementation, the marketplace application may include a checkout module adapted to facilitate online financial transactions with the user 120, and the checkout module may be adapted to accept payment from the user 120 and process the payment via interaction with the service provider 180.

In one implementation, upon merchant instruction, the merchant interface application 142 may be installed and/or run on each merchant device 140. Each merchant may run the merchant interface application 142 on their merchant device 140 to access service provider 180 via the network 160. In one aspect, upon installation and/or execution of the merchant interface application 142, each merchant may be prompted to establish a merchant account for login with the service provider 180, wherein each merchant may use merchant interface application 142 and merchant device 140 to access the service provider 180 via the network 160. In one aspect, when establishing a merchant account, each merchant may be asked to provide business information, such as business name, location information (e.g., address), phone number, etc., and financial information, such as banking information, payment media information (e.g., debit and/or credit card information), taxing entity, etc. In another aspect, information related to the merchant may be packaged as a merchant identifier 146, which is described in greater detail herein.

In various implementations, the merchant interface application 142 may include one or more other applications as may be desired to provide additional features available to the merchant. In various examples, such other applications may include security applications for implementing user-side security features, programmatic applications for interfacing with appropriate application programming interfaces (APIs) over the network 160, and/or various other types of generally known programs and/or software applications. In various other examples, files, data, and/or information may be imported from various types of accounting software (e.g., a spreadsheet application) directly into the merchant interface application 142 for improved tracking of payments and settlements related to electronic commerce via the network 160. As such, it should be appreciated that merchant interface application 142 and any other application may be adapted to make API calls over the network 160.

Each of the merchant devices 140, in various embodiments, may include at least one merchant identifier 146, which may be included as part of the one or more items, products, and/or services made available for purchase so that, e.g., particular items, products, and/or services are associated with particular merchant devices 140. In one implementation, the merchant identifier 146 may include one or more attributes and/or parameters related to the merchant, such as business and/or banking information. For example, the merchant identifier 146 may be passed from each particular merchant 140 to the service provider 180 when the user selects an item, product, and/or service for holding, monitoring, and/or purchasing from each particular merchant 140. In one aspect, the merchant identifier 146 may be used by the service provider 180 to associate particular items, products, and/or services selected for purchase with a particular merchant account maintained by the service provider 180. In another aspect, the user may conduct financial transactions (e.g., selection, monitoring, purchasing, and/or providing payment for items, products, and/or services) with each merchant server 140 via the service provider 180 over the network 160.

In various embodiments, each of the one or more business entities having a related merchant server 140 may need to establish at least one merchant account with the service provider 180. When establishing a merchant account, each of the one or more business entities may need to provide business information, such as owner name, owner address, social security number, date of birth, phone number, email address, etc., and financial information, such as banking information, merchant account information, payment media information (e.g., debit and/or credit card information), payment processing information, etc.

In one embodiment, each merchant device 140 includes at least one network interface component (NIC) 148 adapted for communication with the network 160. For example, in various implementations, the network interface component 148 may comprise a wireless communication component, such as a mobile cellular component, a wireless broadband component, various proximity-based network components such as near field communication (NFC) component, a wireless satellite component, or various other types of wireless communication components including radio frequency (RF), microwave frequency (MWF), and/or infrared frequency (IRF) components adapted for communication with the network 160. In various other implementations, the network interface component 148 may be adapted to interface with a DSL (e.g., Digital Subscriber Line) modem, a PSTN (Public Switched Telephone Network) modem, an Ethernet device, and/or various other types of wired and/or wireless network communication devices adapted for communication with the network 160.

The service provider 180, in one embodiment, may be maintained and operated by a network based transaction processing entity, which may provide processing for network based transactions including online information and/or financial transactions on behalf of the user via the user device 120 and/or each merchant device 140. As shown in FIG. 1, the service provider 180 includes a service interface application 182, which may be adapted to interact with the user device 120 and/or each merchant 140 over the network 160 to facilitate electronic commerce including processing user identity data and information. In various examples, financial transactions may include the selection, purchase, and/or payment of items, products, and/or services by a user via the user device 120 from one or more merchant devices 140. In some examples, purchase and payment for selected items, products, and/or services may include one or more tax assessments. In one embodiment, the service provider 180 may be provided by a network based transaction processing entity, such as PayPal, Inc. and/or eBay of San Jose, Calif., USA.

The service interface application 182, in one embodiment, is adapted to utilize a processing module 184 to interact with the user via the user interface application 122 over the network 160 and process information transactions including purchases and/or payments for financial transactions between the user device 120 and each of the merchant devices 140. In one implementation, the processing module 184 is adapted to resolve financial transactions through validation, delivery, and settlement. For example, the processing module 184 may be adapted to communicate with a clearing house, such as automated clearing house (ACH), to debit a user account related to the user according to an amount specific in a payment and credit therewith a merchant account related to a merchant. In another implementation, the processing module 184 is adapted to assess and disperse taxes for financial transactions through validation, delivery, and settlement. For example, tax assessment may include automatically calculating tax on Internet purchases based on buyer location, seller location, and/or type of items, products, and/or services purchased. Accordingly, the service interface application 182 in conjunction with the processing module 184 is adapted to settle indebtedness on behalf of a user between the user device 120 and each of the merchant devices 140, wherein accounts may be directly and/or automatically debited and/or credited, respectively, of monetary funds in a manner as accepted by the banking industry.

The service interface application 182, in one embodiment, is adapted to utilize a payment authentication module 186 to interact with the user via the user interface application 122 and the service application 126 over the network 160 and authenticate purchase and/or payments on behalf of the user for network based transactions. In one implementation, the payment authentication module 186 is adapted to communicate, interface, and utilize a trusted entity (e.g., resident software on the user device 120, such as the service application 126) to authenticate the user requesting a purchase and/or payment through a resident user interface application, such as the user interface application 122. In one aspect, the payment authentication module 186 is adapted to identify the identity of the user via the user interface application 122 in conjunction with the service application 126 of the user device 120 over the network 160.

In one implementation, the service provider 180 is adapted to distribute the resident software application (e.g., the service application 126) to the user device 120 over the network 160, which may be displayed as an icon on a system tray via the user interface application 122 of the user device 120. When the user requests a purchase and/or payment, the user may enter user credentials via the user interface application 122 and/or service application 126 of the user device 120, such as user name, password, and payment amount, which may also include the use of the user identifier 130. Information related to user credentials may be transmitted to the service provider 180, and the service provider 180 may communicate with the resident software application (e.g., the service application 126) on the user device 120, which may cause a pop-up notification window from the user interface application 122 to display and wait for user confirmation. The user may confirm purchase and/or payment through the pop-up notification window, which may then be conveyed to the service provider 180 over the network 160. After receiving user confirmation, the service provider 180 may authenticate the purchase and/or payment and notify the user and a related merchant of purchase and/or payment authentication over the network 160.

In one implementation, the payment authentication module 186 is adapted to monitor, track, log, and store data and information related to user selection, navigation, purchase, and/or payment events during online navigation by the user via the user device 120. In one aspect, the payment authentication module 186 allows the service provider 180 to monitor, track, log, and store user selection and navigation events during online navigation over the network 160. For example, the service provider 180 interfaces with the user device 120 via, e.g., a browser window to monitor, track, log, and store shopping, purchase, and/or payment events related to the user and the user device 120 during online navigation on merchant sites, social network sites, information resource sites, etc. The payment authentication module 186 may be utilized by the service provider 180 to monitor, track, log, and store user information, merchant information, social network information, resource information, etc.

In one implementation, the payment authentication module 186 is adapted to notify users of data and information (e.g., purchase and payment authentication information). For example, the payment authentication module 186 is adapted to notify or alert the user of authentication, delivery, and settlement of purchases and/or payments.

The service provider 180, in one embodiment, may be configured to maintain one or more user accounts and merchant accounts in an account database 190, each of which may include account information 192 associated with one or more individual users and the one or more merchant devices 140. In various examples, account information 192 may include user identity data and information related to one or more users and/or merchants. In various other examples, account information 192 may include inventory information, such as types of items, products, and/or services proffered for sale by the user and/or merchants. As such, it should be appreciated that the user may be considered a buyer or seller and proffer items, products, and/or services for sale over the network 160, without departing from the scope of the present disclosure. It should also be appreciated that the merchant may be considered a buyer or seller and proffer items, products, and/or services for sale over the network 160, without departing from the scope of the present disclosure.

In one example, account information 192 may include user information related to selection, navigation, purchase, and/or payment events for online transactions over the network 160. In another example, account information 192 may include private financial data and information of the user and/or each merchant 140, such as one or more locations, addresses, account numbers, passwords, payment media information (e.g., debit and/or credit card information), banking information, or other types of financial information, which may be used to facilitate online financial transactions between the user and the one or more merchant devices 140. In various implementations, the methods and systems described herein may be modified to accommodate additional users and/or additional merchants that may or may not be associated with at least one existing user account and/or merchant account, respectively.

In one implementation, the user and/or user device 120 may have identity attributes stored with the service provider 180 as the user identifier 126, and the user and/or user device 120 may have credentials to authenticate or verify identity with the service provider 180. In one aspect, user attributes may include personal information and banking information, as previously described, including location, tax rates, etc. In other aspects, the user attributes may be passed to the service provider 180 as part of a login and/or transaction request, and the user attributes may be utilized by the service provider 180 to associate the user and/or the user device 120 with one or more particular user accounts in the account database 190 maintained by the service provider 180.

In another implementation, each of the merchants and/or merchant devices 140 may have identity attributes stored with the service provider 180 as merchant identifiers 146, and each of the merchant devices 140 may have credentials to authenticate or verify identity with the service provider 180. In one aspect, merchant attributes may include personal, business, and banking information, as previously described, including location, tax rates, etc. In other aspects, the merchant attributes may be passed to the service provider 180 as part of a login and/or transaction request, and the merchant attributes may be utilized by the service provider 180 to associate each of the merchant devices 140 with one or more merchant accounts in the account database 190 maintained by the service provider 180.

The service provider 180, in various embodiments, may include a network interface component (NIC) 194 adapted for communication with the network 160 and any network based communication devices including the network interface component 128 of the user device 120 and the network interface component 148 of each merchant 140. In various implementations, the network interface component 194 of the service provider 180 may include a wireless communication component, such as a wireless broadband component, various proximity-based network components such as near field communication (NFC) component, a wireless satellite component, or various other types of wireless communication components including radio frequency (RF), microwave frequency (MWF), and/or infrared frequency (IRF) components adapted for communication with the network 160. In other various implementations, the network interface component 148 may be adapted to interface with a DSL (e.g., Digital Subscriber Line) modem, a PSTN (Public Switched Telephone Network) modem, an Ethernet device, and/or various other types of wired and/or wireless network communication devices adapted for communication with the network 160.

The service provider 180, in one embodiment, may include one or more databases 196 (e.g., internal and/or external databases) for storing and tracking information related to network based information and financial transactions, including user identity information, between one or more users, merchant devices 140, and service provider 180. In one aspect, the databases 196 may provide a historical survey of financial transactions between the user device 120, the one or more merchant devices 140, and the service provider 180. For example, the service interface application 182 may be adapted to monitor, track, log, and store transaction information, including user identity data and information, related to network based electronic commerce between the user device 120, each merchant 140, and/or the service provider 180, and the stored transaction information is accessible from the databases 196 for assessment, analysis, maintenance, and settlement. In another example, the service interface application 182 may be adapted to monitor, track, log, and store user information related to selection, navigation, purchase, and/or payment events for online transactions over the network 160.

Figure 2A:
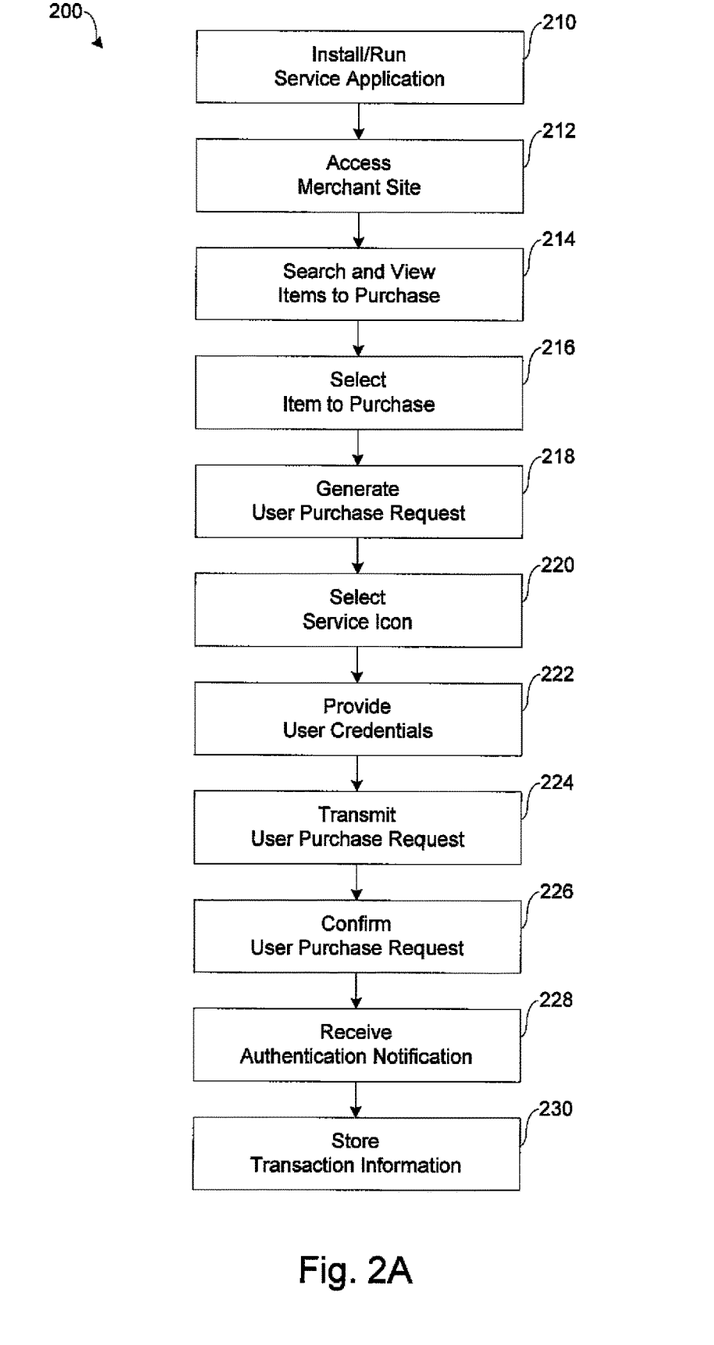
FIGS. 2A-2B show block diagrams of various methods adapted to facilitate electronic commerce over a network, in accordance with embodiments of the present disclosure.

FIG. 2A shows one embodiment of a method 200 for facilitating client-side online transactions between the service provider 180 and the user via the user device 120. In one aspect, the service application 126 allows the user via the user device 120 to communicate with the service provider 180 over the network 160 to authenticate user purchase and/or payment requests. For purposes of explanation, the method 200 of FIG. 2A is described in reference to the system 100 of FIG. 1, but should not be limited thereto.

In one implementation, upon user instruction, the service application 126 may be installed and/or run on the user device 120 (block 210). The user may run the user interface application 122 on the user device 120 to access at least one merchant website via a related merchant server 140 (block 212) to search the accessed merchant website and view one or more items for purchase (block 214). In one embodiment, upon installation, the user may be prompted to establish a user account with the service provider server 180, wherein the user may interface with the user device 120 to access the service provider server 180 via the network 160. When establishing a user account, the user may be asked to provide personal information, such as name, address, phone number, etc., and financial information, such as banking information, payment media information (e.g., debit card information and/or credit card information), etc. In one embodiment, information related to the user may be packaged as the user identifier 130.

Referring to FIG. 2A, the user may select at least one item for purchase (block 216) from a merchant 140 and generate a user purchase request and/or payment request (block 218) by selecting the service icon (block 220) displayed by the user device 120. In one aspect, as described herein, the service icon comprises an image or icon displayed on the system tray of the user device 120 doe selection by the user. In another aspect, the user purchase request includes at least one of user information, merchant information, and/or selected item information embedded as arguments in an expression, which may be passed to the service provider server 180 over the network 160. In still another aspect, the user information may include user identifier information, the merchant information may include the merchant identifier information, and the selected item information may include one or more image attributes, including item identifier information, having dynamic arguments identifying the item and/or merchant providing the item for purchase and/or payment.

Once the user selects the service icon, the user is prompted via, for example, a pop-up window, to input or enter user identification information including user credentials (block 222). When enabled, the service icon provides a purchase and/or payment mechanism that may be adapted to transmit the user payment and/or purchase request (block 1224) along with image identifier information and/or the user identifier 130, the merchant identifier 148, and/or the item identifier to the service provider server 180 for purchase and/or payment processing. When selecting an item to purchase, the user may utilize a cursor control component (e.g., mouse) to select and drag an item icon or image, representing a selected item for purchase, from the merchant site to a service icon either on the desktop, in a toolbar, or in the browser. It should be appreciated that user identification may be provided as the user identifier 130 and passed with the user purchase and/or payment request, and the service provider server 180 may ask for verification of user identification from the user.

Referring to FIG. 2A, the user may confirm the user purchase and/or payment request (block 226) by providing user credentials or at least verifying user identification for a related user account stored in service provider server 180 so that funds may be deducted from the user account for purchase and/or payment of the selected item. Once user credentials are verified, the online purchase and/or payment transaction may be completed, and the user may receive authentication notification over the network 160 (block 228).

In one aspect, it should be appreciated by those skilled in the art that more than one item may be selected for purchase and/or payment prior to completing the online purchase and/or payment transaction. For example, a plurality of items may be selected and placed in a virtual shopping cart by the user and then purchased in a single online purchase and/or payment transaction. Optionally, in another aspect, each item selected for purchase and/or payment may be purchased and/or paid for separately without departing from the scope of the present disclosure.

Referring to FIG. 2A, transaction information may be stored as user information (block 230). In one aspect, user information may include attributes related to the user including user name, user account number, user location, payment media information, etc., which may be stored as part of the user account in the account database 190. In another aspect, user information may include data and information related to user selection events, user navigation events, user purchase events, and/or user payment events, which may be stored as part of the user account in the account database 190.

In one implementation, one or more other databases (e.g., internal and/or external databases 196) may be utilized to store user related data and information. Databases may provide a historical survey of user information and financial transactions between the user device 120, the one or more merchant devices 140, and the service provider 180. For example, the service provider 180 may be adapted to monitor, track, log, and store user information related to network based information exchanges between the user device 120, each merchant 140, and/or the service provider 180. Any stored user information may be accessible from databases 196 for assessment, analysis, maintenance, and settlement.

In another implementation, any data and information related to user selection events, user navigation events, user purchase events, and/or user payment events may be displayed via a display device to a user of the user device 120 and/or an administrator of the service provider 180 without departing from the scope of the present disclosure.

Figure 2B:
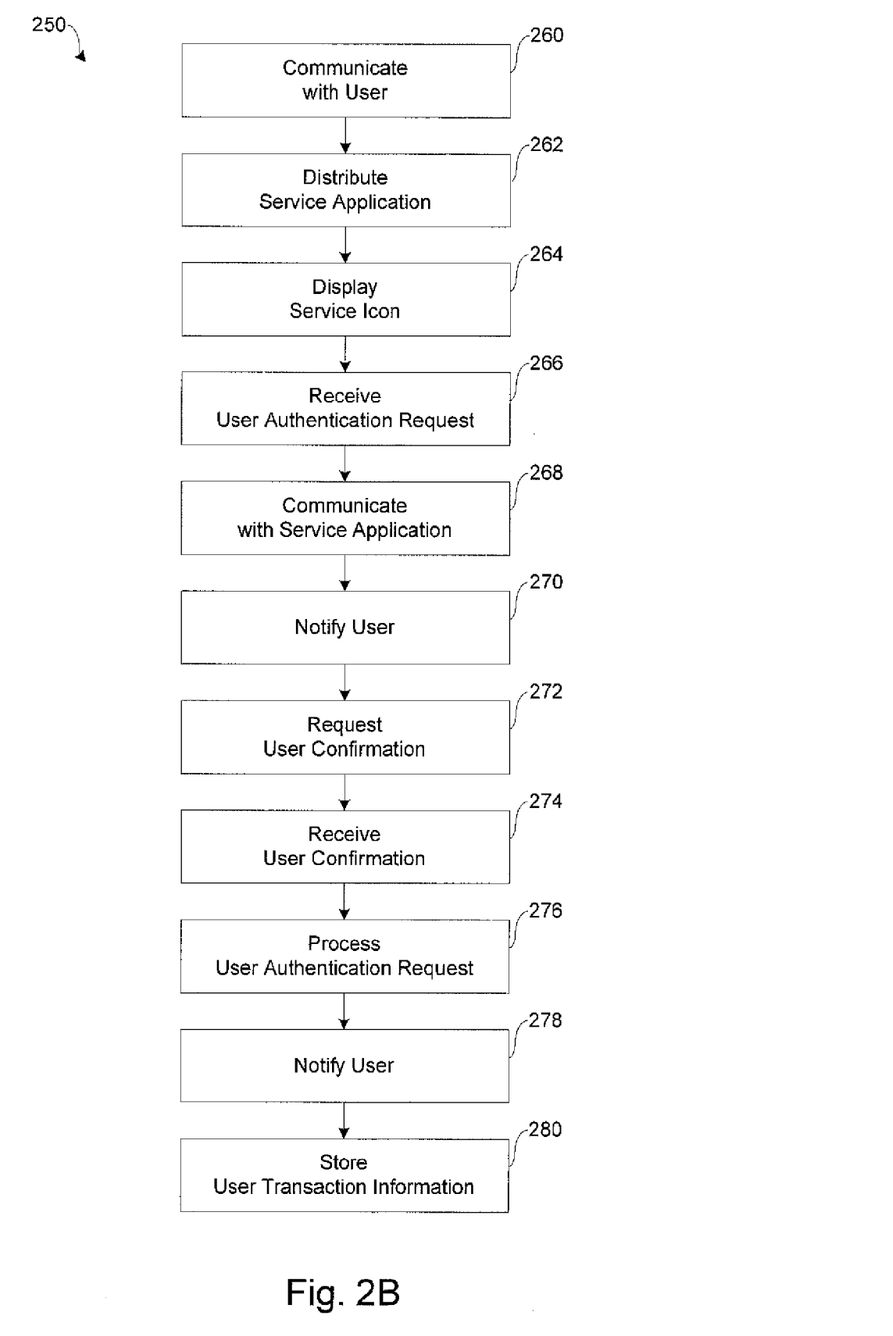

FIG. 2B shows one embodiment of a method 250 for facilitating server-side online transactions between the service provider 180 and the user via the user device 120. In one aspect, the service application 126 allows the service provider 180 to communicate with the user via the user device 120 over the network 160 to authenticate user purchase and/or payment requests. For purposes of explanation, the method 250 of FIG. 2B is described in reference to the system 100 of FIG. 1, but should not be limited thereto.

Referring to FIG. 2B, the service provider 180 is adapted to communicate with a user via the user device 120 over the network 160 (block 260). In one implementation, the service provider 180 utilizes the service interface application 182 to communicate with the user over the network 160 via the user interface application 122 of the user device 120. The processing module 184 may be utilized by the service interface application 182 to process transactions (e.g., information and financial transactions) over the network 160. The processing module 186 may be utilized by the service interface application 182 to monitor, track, log, and store data and information related to user selection, navigation, purchase, and/or payment events over the network 160. The payment authentication module 186 is adapted to interact with the user via the user interface application 122 and the service application 126 over the network 160 and authenticate purchase and/or payments on behalf of the user for network based transactions. In one implementation, the payment authentication module 186 is adapted to communicate, interface, and utilize a trusted entity (e.g., resident software on the user device 120, such as the service application 126) to authenticate the user requesting a purchase and/or payment through a resident user interface application, such as the user interface application 122. In one aspect, the payment authentication module 186 is adapted to identify the identity of the user via the user interface application 122 in conjunction with the service application 126 of the user device 120 over the network 160.

Referring to FIG. 2B, the service provider 180 is adapted to distribute the service application 126 to the user via the user device 120 over the network 160 (block 262). In one implementation, the service provider 180 is adapted to upload the service application 126 to the user device 120 over the network 160. Upon installation, the service application 126 is adapted to display the service icon to the user via a display component of the user device 120 (block 264). In one aspect, when installed and executed by the user device 120, the service application 126 is adapted to provide and display a purchase mechanism and/or payment mechanism, such as an image or icon, on a display component (e.g., monitor) of the user device 120 including a system tray displayed by the user device 120. In one aspect, the service application 126 comprises a trusted entity (e.g., resident software on the user device 120) to authenticate the user requesting a purchase and/or payment through the resident user interface application 122, such as a network browser on the user device 120.

The service provider 180 is adapted to receive a user authentication request, such as a user purchase request or user payment request, from the user via the user device 120 over the network 160 (block 266). In one implementation, when the user requests authentication of a purchase and/or payment, the user may input or enter data and information related to user credentials through the user interface application 122 of the user device 120, such as user name, password, and payment amount. Information related to user credentials is transmitted to the service provider 180 over the network 160, and the service provider 180 is adapted to communicate with the resident service application 126 on the user device 120 (block 268), which causes a pop-up notification window from the system tray to display (block 270) and request user confirmation (block 272). The user may confirm purchase and/or payment through the pop-up notification window, which may be conveyed to the service provider 180 over the network 160 (block 274). After receiving user confirmation, the service provider 180 may process the user authentication request (block 276) by authenticating the purchase and/or payment and then notify the user (block 278) that the purchase and/or payment has been authenticated. In one aspect, one or more merchants involved in the transaction with the user may be notified of purchase and/or payment authentication.

In one implementation, the resident service application 126 is distributed, installed, and run on the user device 120. The user may utilize the user interface application 122 on the user device 120 to access at least one merchant website via a related merchant server 140 to search the accessed merchant website and view one or more items for purchase. Upon installation, the user may be prompted to establish a user account with the service provider server 180, wherein the user may interface with the user device 120 to access the service provider server 180 via the network 160. When establishing a user account, the user may be asked to provide personal information, such as name, address, phone number, etc., and financial information, such as banking information, payment media information (e.g., debit card information and/or credit card information), etc. In one embodiment, information related to the user may be packaged as the user identifier 130.

The service provider 180 is adapted to obtain user information, such as identity data and information, from communication with the user via the user device 120 over the network 160. In one implementation, the service provider 180 may prompt the user to login from the user device 120 over the network 160. As such, the user may login to a server of the service provider 180 to provide user related information. The service provider 180 is adapted to determine user identity based on information obtained from communication with the user via the user device 120 over the network 160. In one aspect, user identity information may include attributes related to the user, such as personal information related to the user (e.g., usernames, passwords, account numbers, payment media information, photograph images, biometric ids, addresses including location information, phone numbers, etc.) and banking information (e.g., banking institutions, debit card issuers, credit card issuers, user account numbers, payment media information, security information, etc.). User identity information may be utilized by the service provider 180 to verify identity of the user along with verifying payment media, such as debit cards and/or credit cards.

The service provider 180 is adapted to access a user account related to the user in the account database 190 based on user information passed from the user device 120 over the network 160. The service provider device 180 is adapted to locate and access an account related to the user in the account database 190. If the user is determined to be an existing user by the service provider 180, then the service provider 180 is adapted to verify the user account and user identity information obtained from the user 102 by comparing the obtained user information with account information 192 stored as part of the user account in the account database 190. The service provider 180 may determine if the user account is current and active. In some instances, user account information may need to be updated, and as such, the service provider device 180 may prompt the user 102 to update user account information 188, including payment media information (e.g., debit card and/or credit card numbers, expiration dates, etc.), in the user account. The updated information may include other payment media information, including a change of address.

It should be appreciated by those skilled in the art that the service provider 180 may cancel any user request at any time during the process of method 200 if, for example, it is determined by the service provider 180 that the user enters wrong information or the user is trying to access an account with criminal intent.

In one implementation, referring to FIG. 2B, the service provider 180 is adapted to monitor, track, log, and store data and information related to user selection, navigation, purchase, and/or payment events over the network 160 during online navigation by the user via the user device 120 over the network 160. The service provider 180 interfaces with the user device 120 via the user interface application 122 (e.g., browser application) to monitor, track, log, and store user selection, navigation, purchase, and/or payment events over the network 160 during online navigation over the network 160. For example, a user may visit an online resource, social, and/or merchant website and select pages to view data and information related to the particular site.

In one aspect, a user may visit an online merchant website and navigate through the product pages to select one or more items for purchase. The selected items may be placed in a virtual shopping cart until checkout. When the user is done shopping, the user may access a merchant webpage for viewing the selected items in the virtual shopping cart. At this merchant page, the user may decide to checkout (i.e., purchase) and select a link to the service provider 180 to request processing of the purchase transaction. Upon user selection, the service provider 180 may receive a purchase and/or payment request in reference to the shopping cart and the one or more items selected for purchase. In one implementation, the user purchase and/or payment request includes data and information related to the transaction including user information (e.g., user name, user account, user location, payment media information, etc.) and merchant information (e.g., merchant name, merchant account, merchant location, and one or more items selected for purchase including item description, category, price, weight, size, etc.).

Referring to FIG. 2B, the service provider 180 is adapted to store user transaction information (block 280). In one aspect, user information may include attributes related to the user including user name, user account number, user location, payment media information, etc., which may be stored as part of the user account in the account database 190. User information may include data and information related to user selection, navigation, purchase, and/or payment events, which may be stored as part of the user account in the account database 190. In another aspect, the service provider 180 may utilize one or more other databases (e.g., internal and/or external databases 196) for storing data and information related to user information. Databases utilized by the service provider 180 may provide a historical survey of user information and financial transactions between the user device 120, the one or more merchant devices 140, and the service provider 180. The service provider 180 may be adapted to monitor, track, log, and store user information related to network based information exchanges between the user device 120, each merchant 140, and/or the service provider 180. The stored user information is accessible from the databases 196 for assessment, analysis, maintenance, and settlement. In still another aspect, any data and information related to monitoring user selection, navigation, purchase, and/or payment events may be displayed via a display device to a user of the user device 120 and/or an administrator of the service provider 180, without departing from the scope of the present disclosure.

Figure 3A:
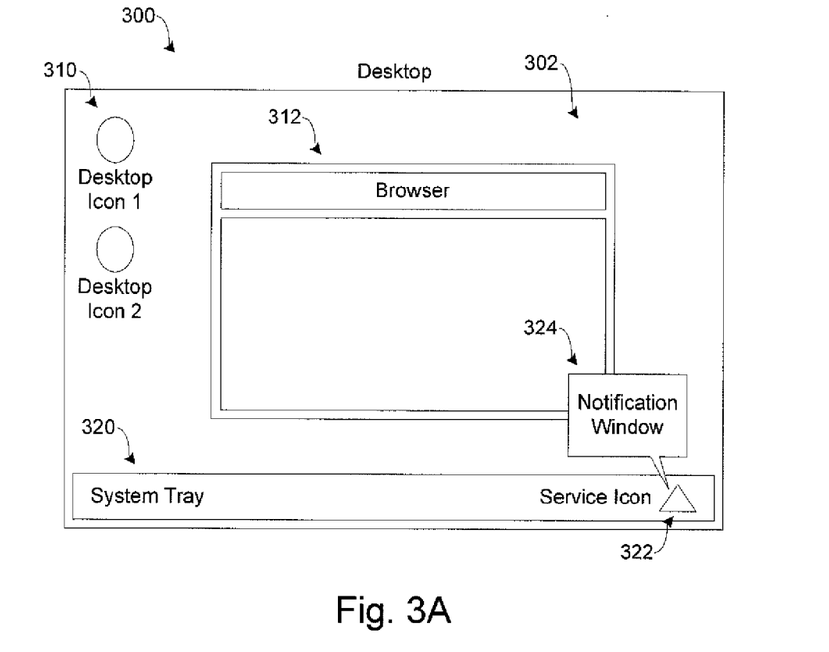
FIGS. 3A-3B show various embodiments of a service icon, in accordance with embodiments of the present disclosure.
Figure 3B:
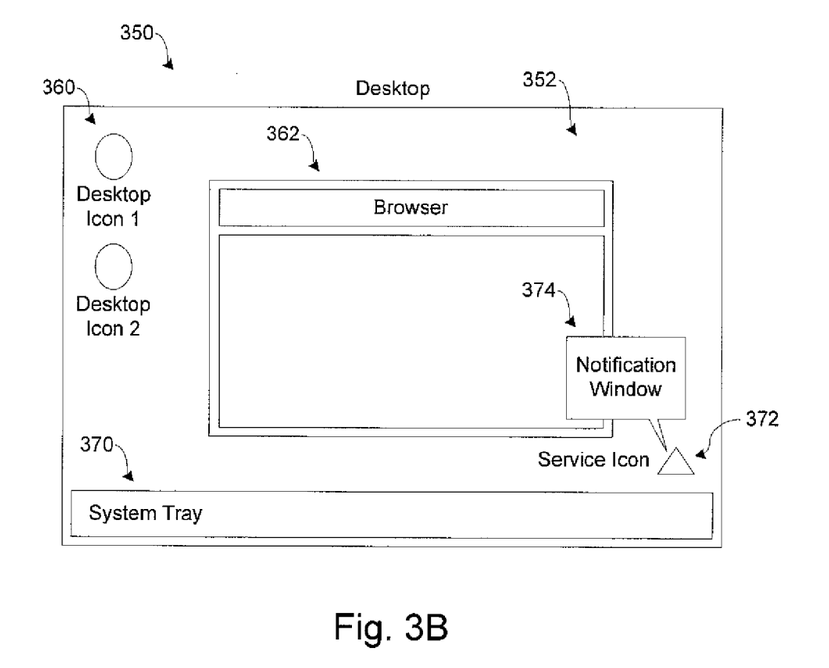

FIGS. 3A-3B show various embodiments of a service icon. In particular, FIG. 3A shows an image of a computer desktop 300 displaying a service icon 322 in a system tray 320, and FIG. 3B shows an image of a computer desktop 350 displaying a service icon 372 in a desktop area 352.

Referring to FIG. 3A, a display component of the user device 120 is adapted to display one or more desktop icons 310, a browser window 312, and the system tray 320 in a desktop area 302 of the computer desktop environment 300. In one embodiment, the user utilizes the user interface application 122 to open the browser window 312 and access a merchant server 140 via a merchant site to view a product list having one or more items for purchase. When executed, the service application 126 is adapted to provide the service icon 322 in the system tray 320 of the computer desktop environment 300 so that the user may select the service icon 322 to provide user credentials to the service provider server 180 and/or initiate an authentication request (e.g., purchase request or payment request) with the service provider server 180, in a manner as previously discussed. In another embodiment, the service application 126 is adapted to provide a notification window 324 from the system tray 320 to input user credentials and/or display and notify the user of notification messages, such as a request for user confirmation from the service provider server 180. The service application 126 is adapted to utilize the service icon 322 in conjunction with the notification window 324 to communicate with the service provider server 180.

Referring to FIG. 3B, a display component of the user device 120 is adapted to display one or more desktop icons 360, a browser window 362, and a system tray 370 in the desktop area 352 of the computer desktop environment 350. In one embodiment, the user utilizes the user interface application 122 to open the browser window 362 and access a merchant server 140 via a merchant site to view a product list having one or more items for purchase. When executed, the service application 126 is adapted to provide the service icon 372 in the desktop area 352 of the computer desktop environment 350 so that the user may select the service icon 372 to provide user credentials to the service provider server 180 and/or initiate an authentication request (e.g., purchase request or payment request) with the service provider server 180, in a manner as previously discussed. In another embodiment, the service application 126 is adapted to provide a notification window 374 from the computer desktop environment 352 to input user credentials and/or to display and notify the user of notification messages, such as a request for user confirmation from the service provider server 180. The service application 126 is adapted to utilize the service icon 372 in conjunction with the notification window 374 to communicate with the service provider server 180.

Figure 4:
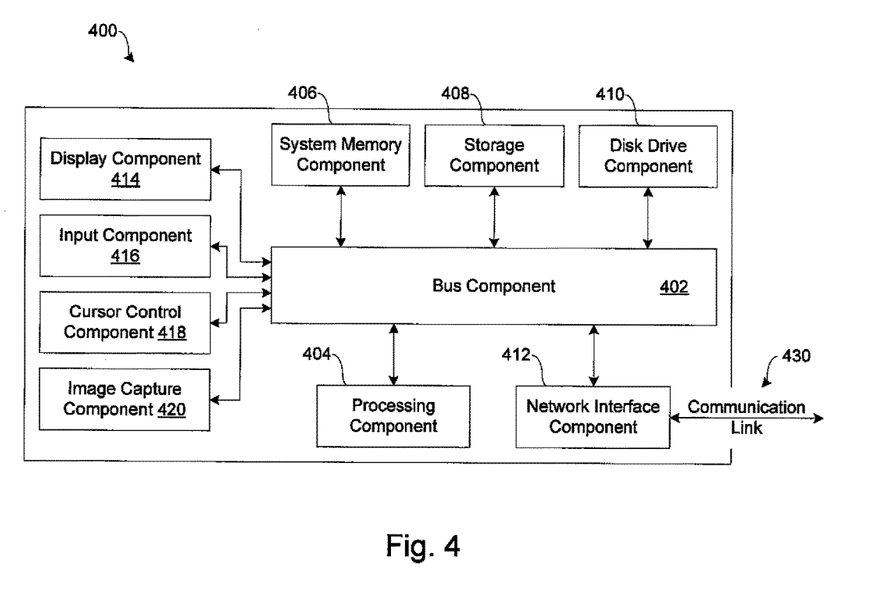
FIG. 4 shows a block diagram of a computer system suitable for implementing one or more embodiments of the present disclosure.

FIG. 4 is a block diagram of a computer system 400 suitable for implementing various embodiments of the present disclosure, including the user device 120, the merchant devices 140, and the service provider device 180. In various implementations, the user device 120 may comprise a network communication device (e.g., mobile cellular phone, laptop, personal computer, etc.) capable of communicating with the network 160, the merchant devices 140 may comprise a network computing device (e.g., a network server), and the service provider device 180 may comprise a network computing device (e.g., a network server). In other implementations, it should be appreciated that the merchant devices 140 and the service provider device 180 may comprise a network communication device (e.g., mobile cellular phone, laptop, personal computer, etc.) capable of communicating with the network 160, without departing from the scope of the present disclosure. Hence, it should be appreciated that each of the devices 120, 140, 180 may be implemented as the computer system 400 for communication with the network 160 in a manner as follows.

In accordance with various embodiments of the present disclosure, computer system 400, such as a mobile communication device and/or a network server, includes a bus 402 or other communication mechanism for communicating information, which interconnects subsystems and components, such as processing component 404 (e.g., processor, micro-controller, digital signal processor (DSP), etc.), system memory component 406 (e.g., RAM), static storage component 408 (e.g., ROM), disk drive component 410 (e.g., magnetic or optical), network interface component 412 (e.g., modem or Ethernet card), display component 414 (e.g., CRT or LCD), input component 416 (e.g., keyboard), cursor control component 418 (e.g., mouse or trackball), and image capture component 420 (e.g., analog or digital camera). In one implementation, disk drive component 410 may comprise a database having one or more disk drive components.

In accordance with embodiments of the present disclosure, computer system 400 performs specific operations by processor 404 executing one or more sequences of one or more instructions contained in system memory component 406. Such instructions may be read into system memory component 406 from another computer readable medium, such as static storage component 408 or disk drive component 410. In other embodiments, hard-wired circuitry may be used in place of or in combination with software instructions to implement the present disclosure.

Logic may be encoded in a computer readable medium, which may refer to any medium that participates in providing instructions to processor 404 for execution. Such a medium may take many forms, including but not limited to, non-volatile media and volatile media. In various implementations, non-volatile media includes optical or magnetic disks, such as disk drive component 410, and volatile media includes dynamic memory, such as system memory component 406. In one aspect, data and information related to execution instructions may be transmitted to computer system 400 via a transmission media, such as in the form of acoustic or light waves, including those generated during radio wave and infrared data communications. In various implementations, transmission media may include coaxial cables, copper wire, and fiber optics, including wires that comprise bus 402

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 430 (e.g., network 160 of FIG. 1, such as a LAN, WLAN, PTSN, and/or various other wired or wireless networks, including telecommunications, mobile, and cellular phone networks) may perform instruction sequences to practice the present disclosure in coordination with one another.

Computer system 400 may transmit and receive messages, data, information and instructions, including one or more programs (i.e., application code) through communication link 430 and communication interface 412. Received program code may be executed by processor 404 as received and/or stored in disk drive component 410 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

It should be appreciated that like reference numerals are used to identify like elements illustrated in one or more of the figures, wherein showings therein are for purposes of illustrating embodiments of the present disclosure and not for purposes of limiting the same.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for facilitating financial transactions over a network, the method comprising:

receiving, by a service provider from a user device of a user over a network, navigation data for navigation events on a merchant website of a merchant by the user device using a browser application;

receiving, by the service provider from the user device, a purchase request for an item from the merchant website via a resident application executing on the user device and separate from the browser application executing on the user device, wherein the purchase request is entered to the resident application through a drag-and-drop process of a shopping icon on the merchant website to the resident application, and wherein the purchase request requires authentication of the user for payment of the purchase request using a user account of the user;

determining, by the service provider, an item identifier of the item on the merchant website using the navigation data;

determining, by the service provider, transaction information for a transaction comprising the item using the item identifier and the merchant website;

generating, by the service provider, a transaction processing interface for the resident application using the transaction, wherein the transaction processing interface comprises the transaction information with item data for the item extracted from the merchant website using the item identifier;

causing, by the service provider, the resident application executing on the user device to display a service icon for the resident application in a system tray of the user device by the service provider and over the network, wherein a selection of the service icon by the user presents the transaction processing interface for review of the transaction information and entry of user credentials for an authentication request of the purchase request in the transaction processing interface;

receiving, by the service provider, the user credentials inputted by the user via the service icon;

receiving, by the service provider, user confirmation of the authentication request through a pop-up notification window from the system tray over the network;

authorizing, by the service provider, the authentication request; and notifying, by the service provider from the user device, the user of the authorized authentication request over the network using the resident application on the user device.

2. The method of claim 1, further comprising communicating with the merchant via a merchant device over the network, wherein the merchant device is adapted to allow the merchant to provide one or more items for purchase over the network, wherein authorizing the authentication request comprises authorizing the purchase request between the user and the merchant, and wherein notifying the user includes notifying the user and the merchant of the authorized purchase request over the network.

3. The method of claim 1, wherein the resident application comprises a payment mechanism that allows the user to generate the purchase request for the item by selecting the item from the merchant website using the browser application and adding the item to one of an interface for the resident application or the service icon of the resident application from the browser application.

4. The method of claim 1, wherein selection of the service icon allows the user to input the user credentials without use of the browser application of the user device.

5. The method of claim 1, wherein the resident application comprises a trusted entity for verifying an identity of the user and authorizing authentication requests on behalf of the user.

6. The method of claim 1, wherein the user credentials include one or more of a user name, a password, or a payment amount.

7. The method of claim 1, wherein the resident application displays the pop-up notification window from the service icon.

8. The method of claim 1, wherein the resident application communicates with the user via the browser application, and wherein the user is notified of the authorized authentication request over the network via the resident application communicating with the browser application.

9. The method of claim 1, further comprising storing information in an account related to the user, wherein the user account includes information related to the user including information related to the user credentials, authentication requests, and authorized authentication requests.

10. The method of claim 1, wherein the user device comprises a mobile communication device.

11. A system comprising:
a non-transitory memory; and
one or more hardware processors coupled to the non-transitory memory and configured to read instructions from the non-transitory memory to cause the system to perform operations comprising:
receiving, by a service provider comprising the system and from a user device of a user over a network, navigation data for navigation events on a merchant website by the user device using a browser application;
receiving, by the service provider from the user device, a purchase request for an item from the merchant website via a resident application executing on the user device and separate from the browser application executing on the user device, wherein the purchase request is entered to the resident application through a drag-and-drop process of a shopping icon on the merchant website to the resident application, and wherein the purchase request requires authentication of the user for payment of the purchase request using a user account of the user;

determining, by the service provider, an item identifier of the item on the merchant website using the navigation events;
determining, by the service provider, transaction information for a transaction comprising the item using the item identifier and the merchant website;
generating, by the service provider, a transaction processing interface for the resident application using the transaction, wherein the transaction processing interface comprises the transaction information with item data for the item extracted from the merchant website using the item identifier;
causing, by the service provider, the resident application executing on the user device to display a service icon for the resident application in a system tray of the user device by the service provider and over the network, wherein a selection of the service icon by the user presents the transaction processing interface for review of the transaction information and entry of user credentials for an authentication request of the purchase request in the transaction processing interface;
receiving, by the service provider, the user credentials inputted by the user via the service icon;
receiving, by the service provider, user confirmation of the authentication request through a pop-up notification window from the system tray over the network;
authorizing, by the service provider, the authentication request; and
notifying, by the service provider from the user device, the user of the authorized authentication request over the network using the resident application on the user device.

12. The system of claim 11, wherein the shopping icon comprises a shopping basket from the merchant website in the browser application, and wherein the shopping basket comprises the item.

13. The system of claim 11, wherein the shopping icon represents a sale offer of the item on the merchant website in the browser application.

14. The system of claim 11, wherein the drag-and-drop process of the shopping icon is to one of the service icon or an interface of the resident application.

15. The system of claim 11, wherein a merchant identifier and the item identifier are embedded in the shopping icon when the shopping icon is entered to the resident application in the drag-and-drop process.

16. The system of claim 15, wherein the purchase request further comprises at least one of an image identifier, selected item information, or image attributes that are further embedded in the shopping icon.

17. A non-transitory machine-readable medium having stored thereon machine-readable instructions executable to cause a machine to perform operations comprising:
receiving, by a service provider from a user device of a user over a network, navigation data for navigation events on a merchant website by the user device using a browser application;
receiving, by the service provider from the user device, a purchase request for an item from the merchant website via a resident application executing on the user device and separate from the browser application executing on the user device, wherein the purchase request is entered to the resident application through a drag-and-drop process of a shopping icon on the merchant website to the resident application, and wherein the purchase request requires authentication of the user for payment of the purchase request using a user account of the user;

determining, by the service provider, an item identifier of the item on the merchant website using the navigation events;

determining, by the service provider, transaction information for a transaction comprising the item using the item identifier and the merchant website;

generating, by the service provider, a transaction processing interface for the resident application using the transaction, wherein the transaction processing interface comprises the transaction information with item data for the item extracted from the merchant website using the item identifier;

causing, by the service provider, the resident application executing on the user device to display a service icon for the resident application in a system tray of the user device by the service provider and over the network, wherein a selection of the service icon by the user presents the transaction processing interface for review of the transaction information and entry of user credentials for an authentication request of the purchase request in the transaction processing interface;

receiving, by the service provider, the user credentials inputted by the user via the service icon;

receiving, by the service provider, user confirmation of the authentication request through a pop-up notification window from the system tray over the network;

authorizing, by the service provider, the authentication request; and notifying, by the service provider from the user device, the user of the authorized authentication request over the network using the resident application on the user device.

18. The non-transitory machine-readable medium of claim 17, wherein the shopping icon comprises a shopping basket from the merchant website in the browser application, and wherein the shopping basket comprises at least the item.

19. The non-transitory machine-readable medium of claim 17, wherein the shopping icon represents a sale offer of the item on the merchant website in the browser application.

20. The non-transitory machine-readable medium of claim 17, wherein a merchant identifier and the item identifier are embedded in the shopping icon when the shopping icon is entered to the resident application in the drag-and-drop process.

* * * * *